(12) United States Patent
Berg et al.

(10) Patent No.: US 7,860,587 B2
(45) Date of Patent: Dec. 28, 2010

(54) PROJECTION-AREA DEPENDENT DISPLAY/OPERATING DEVICE

(75) Inventors: Winfried Berg, Heidelberg (DE); Volkhard Franke, Hirschberg (DE); Dieter Hauck, Eberbach (DE); Michael Kaiser, Heidelberg (DE); Manfred Schneider, Bad Rappenau (DE); Bernhard Wagensommer, Malsch (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 1509 days.

(21) Appl. No.: 11/047,041

(22) Filed: Jan. 31, 2005

(65) Prior Publication Data

US 2005/0168700 A1 Aug. 4, 2005

(30) Foreign Application Priority Data

Jan. 29, 2004 (DE) .................. 10 2004 004 395

(51) Int. Cl.
- *G05B 19/18* (2006.01)
- *G06K 9/00* (2006.01)
- *G06K 9/34* (2006.01)
- *G03B 21/14* (2006.01)
- *G03B 21/22* (2006.01)
- *G03B 21/00* (2006.01)
- *H04N 7/14* (2006.01)

(52) U.S. Cl. .................. 700/59; 382/167; 382/173; 353/48; 353/74; 353/79; 353/122; 348/14.03; 348/14.07; 348/14.08; 348/14.09; 362/162

(58) Field of Classification Search ................. 700/59; 382/173, 167, 162; 353/48, 74, 79, 122; 348/14.07–14.09, 14.03
See application file for complete search history.

(56) References Cited

U.S. PATENT DOCUMENTS

| | | | | |
|---|---|---|---|---|
| 4,428,287 | A | * | 1/1984 | Greiner ...................... 101/170 |
| 4,596,183 | A | * | 6/1986 | Steiner et al. ............... 101/216 |
| 4,596,468 | A | * | 6/1986 | Simeth ....................... 356/400 |
| 5,023,812 | A | * | 6/1991 | Pfeiffer ...................... 358/1.1 |

(Continued)

FOREIGN PATENT DOCUMENTS

DE 37 07 866 A1 10/1987

(Continued)

OTHER PUBLICATIONS

Wellner-P., "Interacting wityh Papwer on the Digital Desk" 1993 ACM p. 87-96.*

(Continued)

*Primary Examiner*—Albert DeCady
*Assistant Examiner*—Thomas H Stevens
(74) *Attorney, Agent, or Firm*—Laurence A. Greenberg; Werner H. Stemer; Ralph E. Locher (57) ABSTRACT

A display and/or operating device for controlling machines includes a projection device for projecting an image onto a projection area, an acquisition device for scanning the same projection area, and a control computer for controlling the projection device and the acquisition device. The present invention is distinguished by the fact that, by the acquisition device and the control computer, an analysis of the same projection surface can be carried out, and that the content of the image to be projected can be controlled by the control computer as a function of the result of the analysis of the same projection area.

18 Claims, 5 Drawing Sheets

U.S. PATENT DOCUMENTS

| | | | |
|---|---|---|---|
| 5,163,012 A * | 11/1992 | Wuhrl et al. | 382/112 |
| 5,182,721 A * | 1/1993 | Kipphan et al. | 382/112 |
| 5,436,939 A | 7/1995 | Co et al. | |
| 5,467,436 A * | 11/1995 | Rodi et al. | 358/1.15 |
| 5,513,099 A * | 4/1996 | Schein | 700/59 |
| 5,732,227 A * | 3/1998 | Kuzunuki et al. | 715/775 |
| 5,801,811 A * | 9/1998 | Lo et al. | 355/22 |
| 5,943,451 A * | 8/1999 | Lee | 382/313 |
| 6,091,996 A * | 7/2000 | Whitehead et al. | 700/57 |
| 6,175,610 B1 | 1/2001 | Peter | |
| 6,205,636 B1 * | 3/2001 | Abe et al. | 29/407.1 |
| 6,359,676 B1 * | 3/2002 | Treiber et al. | 355/46 |
| 6,424,900 B2 * | 7/2002 | Murray et al. | 701/48 |
| 6,516,244 B1 * | 2/2003 | Yoo et al. | 700/218 |
| 6,650,771 B1 * | 11/2003 | Walker | 382/162 |
| 6,728,423 B1 * | 4/2004 | Rubbert et al. | 382/294 |
| 6,984,043 B2 * | 1/2006 | Nakamura et al. | 353/94 |
| 7,043,330 B2 * | 5/2006 | Toyserkani et al. | 700/166 |
| 7,058,474 B2 * | 6/2006 | Ganot et al. | 700/192 |
| 7,062,354 B2 * | 6/2006 | Ganot et al. | 700/192 |
| 7,069,516 B2 * | 6/2006 | Rekimoto | 715/757 |
| 7,181,363 B2 * | 2/2007 | Ratti et al. | 702/159 |
| 7,187,472 B2 * | 3/2007 | Friedman et al. | 358/1.9 |
| 2001/0020933 A1 | 9/2001 | Maggioni | |
| 2002/0075240 A1 | 6/2002 | Lieberman et al. | |
| 2002/0180726 A1 | 12/2002 | Shi et al. | |
| 2003/0030824 A1 * | 2/2003 | Ogasahara et al. | 358/1.8 |
| 2004/0168601 A1 * | 9/2004 | Petermann | 101/483 |
| 2005/0169506 A1 * | 8/2005 | Fenrich et al. | 382/127 |

FOREIGN PATENT DOCUMENTS

| | | |
|---|---|---|
| DE | 198 45 027 A1 | 4/2000 |
| DE | 199 51 322 A1 | 4/2001 |
| DE | 100 07 891 A1 | 9/2001 |
| EP | 0 783 149 A1 | 7/1997 |
| GB | 2 188 171 A | 9/1987 |
| JP | 9319556 A | 12/1997 |
| JP | 2001350586 A | 12/2001 |
| JP | 2002232849 A | 8/2002 |
| WO | 0154110 A1 | 7/2001 |

OTHER PUBLICATIONS

German Office Action dated Oct. 1, 2008.
English translation of Japanese Office Action dated Jun. 4, 2010.

* cited by examiner

PROJECTION-AREA DEPENDENT DISPLAY/OPERATING DEVICE

BACKGROUND OF THE INVENTION

Field of the Invention

The present invention relates to a display and/or operating device for controlling machines, having a projection device for projecting an image onto a projection area, an acquisition device for scanning the projection area, and a control computer for controlling the projection device and the acquisition device.

In the operation of presses, it is, nowadays, necessary for the operator to keep his eye on many operating elements and displays, which are distributed at a number of locations in the press. For example, the control desk of a press normally has a monitor, through which the most important settings on the press can be made. Furthermore, beside the monitor, there is normally a supporting desk for printed sheets, further operating elements (for example, for adjusting the inking zones of the press) being located grouped around the sheet support. In addition, there are functions on the press that can be operated only through further operating elements that, for example, are located on the individual printing units, on the feeder or deliverer. The many operating elements of the press are, therefore, locally distributed and cannot, therefore, always be handled quite simply because, in addition, only the main monitor on the control desk of the press also has appropriate help functions, which are not available in the operating elements on the individual printing units.

In recent years, new operating concepts are being developed increasingly, for example, also including the functional principle of the virtual touch screen. Such a virtual touch screen does not need a touch-sensitive surface and is disclosed by German Published, Non-Prosecuted Patent Application DE 199 51 322 A1. Here, by a projector, an operating interface is projected onto a predefined area, it being possible for the operator to touch and control this projected operating interface with his/her fingers. If the operator points to a switching area of the virtual operating interface with a finger, then, after a predefined minimum time period, the position of the finger of the user is recorded by a camera instead of a touch-sensitive sensor and is evaluated by a computer. As such, it is possible for the operator to control an apparatus with a virtual operating interface without having to provide a real touch screen.

A similar approach is followed in DE 100 07 891 A1 (corresponding to U.S. Patent Publication No. 2001/0020933 to Maggioni), which describes an interactive shop display window. In Maggioni, there is a projector on the shop inside of the display window that projects an operating interface onto the display windowpane from the inside so that passers-by can see the operating interface. Then, if the passers-by touch individual operating elements of the operating interface with their fingers, then the touch of the passers-by is registered by a camera and passed on to a computer. Depending on the operating elements touched, the image from the projector is, then, changed. In this case, too, the camera evaluates the position of the finger and actuation is not a matter of actually touching the display window; it is sufficient if the finger comes close and its position can be identified unambiguously.

However, the two patent applications cited have the disadvantage that the operating interface can be projected only onto a permanently predefined surface. In such a case, no account is taken of a changing projection surface.

SUMMARY OF THE INVENTION

It is accordingly an object of the invention to provide a projection-area dependent display/operating device that overcomes the hereinafore-mentioned disadvantages of the heretofore-known devices of this general type and that also functions with changing projection areas.

With the foregoing and other objects in view, there is provided, in accordance with the invention, a display and/or operating device for controlling machines, including a projection device for projecting an image onto a projection area, an acquisition device for scanning the projection area, a control computer connected to the projection device and to the acquisition device for controlling the projection device and the acquisition device, and the control computer being programmed to carry out an analysis of the projection area with the acquisition device and to control content of the image to be projected as a function of a result of the analysis of the projection area.

The present invention initially also has a projection device, with which an image or an operating interface is thrown/projected onto any desired projection area. The projection device is expediently a video or data projector that is connected to a control computer. Additionally connected to the control computer, as in the prior art, is an acquisition device, with which the image thrown onto the projection area or the operating interface can be acquired. As opposed to the prior art, however, a camera suitable for such a purpose as an acquisition device does not just evaluate the touching of specific elements of the projected image or of the operating interface by an operator but, additionally, analyzes the projection area per se. Thus, first, for example in the case of a very dark projection area, the acquisition device and the connected control computer ensure that the projection image does not contain dark color components because these would not be visible on a dark projection area. In addition, the content of the projection image or of the projected operating interface itself depends on the nature of the projection area, that is to say, the appearance of the projected image or of the operating interface is changed as a function of the nature of the projection area. For example, if the image is thrown onto the surface of a sheet that is lying on the desk of the control station of a press, then, in the case of a completely white sheet, a different image is projected than in the case of a printed sheet. For example, no displays for the inking zone control are, then, to be seen on the white sheet because this makes sense only in the case of a color-printed sheet.

In accordance with another feature of the invention, the image is an operating interface. As such, it is possible for the projected image not only to replace the display device of a monitor but also to offer the full functionality of a touch screen display, that is to say, the operator can touch operating elements of the projected image with his fingers, as in the case of a touch screen, and can trigger corresponding functions. Therefore, the projected image serves as a fully adequate operating interface.

In accordance with a further feature of the invention, the operating interface is capable of projection onto the printing material of a press. To be able to carry out fine-tuning of the settings of a press after the first proof print, a proof sheet is normally placed on a supporting desk beside the control station of the press and assessed by a printer. If the printed image does not meet the requirements, the settings of the press have to be changed accordingly. By the device according to the invention, it is now possible to project an operating interface for changing the settings directly onto the printing material and, in this way, to bring the individual operating elements of the operating interface into the immediate context of the printing material. The printer, therefore, no longer has to turn to an additional operating desk or monitor, but has the operating interface and printing material lying immediately in front of him/her.

In accordance with an added feature of the invention, the operating interface is capable of projection onto a printed printing material and for the appearance of the operating interface to be capable of change by the control computer as a function of the nature of the printing material. In such a case, first of all, the colored representation of the printed printing material is taken into account so that the operating interface can, for example, be adapted such that there are no operating elements in the very dark regions of the printing material because these would be difficult to detect or even undetectable visually by the printer. This can be done, for example, by a different configuration of the individual operating elements on the operating interface by the control computer so that the operating elements and displays are located only in the light regions. In addition, the operating interface can be adapted automatically to the format of the printing material because a smaller sheet format has fewer inking zones, for example, than a larger sheet format. In the case of a smaller sheet format, only the inking zones that are also actually present on the sheet are displayed. As such, the operator is confronted only by operating elements that are actually needed to carry out changes on the printing material present at that time.

In accordance with an additional feature of the invention, provision is further made for the projection device and the acquisition device to be located on the same side with respect to the projection area. As such, the image can also be projected onto surfaces that are not translucent, such as the side wall of a press.

In accordance with yet another feature of the invention, the projection device is located on one side of the projection area and the acquisition device to be located on the other side of the projection area. For example, the supporting surface of a sheet-supporting desk can be made of glass or another transparent material so that the operating interface can be projected from the interior of the sheet-supporting desk onto a sheet lying on the glazed supporting surface, by a projector fitted therein. If the printing material sheet is not completely opaque, the printer can, nevertheless, still perceive the operating interface visually. The advantage of such a construction resides, inter alia, in the fact that the projector in the interior of the sheet-supporting desk is protected against contamination.

In accordance with yet a further feature of the invention, there are provided a sheet support, a sheet-supporting desk having an interior, and the projection device being disposed underneath the sheet support in the interior of the sheet-supporting desk.

In accordance with yet an added feature of the invention, a change in the operating interface takes place as a function of the operating elements touched or actuated on the operating interface. If, for example, the printer wishes to change the setting of the individual inking zones, then when he/she touches the inking zone display projected onto the printing material, the printer additionally can be given inserted help text, which makes it easier for him/her to set the individual inking zones. In addition, when the operating elements are touched for the purpose of setting inking zones, in each case an associated submenu can be opened and projected onto the printing material so that further operating elements can be made available to the operator and further possibilities relating to the setting can be provided. This refinement of the invention always proves to be particularly advantageous when there are many submenus or further operating elements behind an operating element, that is to say, when there is a complex setting operation. To not confuse the operator, these further possible settings are made visible only when the operator has initially made the basic pre-selection by touch.

In accordance with yet an additional feature of the invention, changes made on the operating interface are capable of display on the projection area by projection display. If a printer, for example, has adjusted the values for the opening of the individual inking zones, then he would certainly like to know how the changes made actually manifest themselves on the printed image. The control computer can, now, compare these changes made and the printed sheet scanned by the camera with each other and then influence the image from the projection device such that the changes made to the inking zones actually become visible on the printed material. This means that a projected image is superimposed on the printed material so that the superimposition of the projected image and the printing material actually present corresponds to the image of a printing material that would have been printed with the changed inking zone settings. If the changes made do not please the operator, then the operator can change them again without difficulty without first having to make a proof print. This saves rejects because it is, now, no longer necessary for proof prints to be made at each change in a setting to verify the result of the changed setting.

In accordance with again another feature of the invention, operating elements of the register setting are activated as a result of touching a register mark on a printed sheet that is the projection area. With such a refinement of the invention, the printer no longer has to know anything about the complex menu structure of the operating interface but simply touches the register mark whose register adjustment he/she wishes to activate, which is, then, projected onto the sheet for him/her by the projection device. When the register setting has been made, this operating area is masked out again so that the appearance of the printed sheet is no longer disrupted. The printer can, therefore, call up the individual operating elements on the operating interface simply by touching areas on the printed sheet on which the changed settings would act.

This, therefore, creates a type of operating guidance that is very simple, agreeable to the printer, and, also, comprehensible.

With the objects of the invention in view, there is also provided a press, including at least one printing unit and a display and/or operating device according to the present invention.

In accordance with again a further feature of the invention, the operating interface is to be operatively connected to a press for controlling the press.

In accordance with again an added feature of the invention, the press has operating elements for setting a register and at least one of the projection device, the acquisition device, and the control computer is configured to actuate the operating elements by touching a register mark on a printed sheet disposed in the projection area.

In accordance with again an additional feature of the invention, for activation of the inking zone setting on the press is carried out when a color-measuring strip of a printed sheet, which is the projection surface, is touched. This also constitutes a further possible way of inserting only the operating elements that the operator currently needs. It is, therefore, also possible to configure the operating interface such that a sheet lying on a supporting desk beside the press is, then, provided only with operating elements when corresponding points on the sheet are touched. Otherwise, the operator sees only the printed sheet, without the operating elements inserted for him/her supplying a visually changed impression of the sheet. Because the color-measuring strip is used to control the printed colors, it is expedient to link the activation of the inking zone setting to touching the color-measuring strip.

In accordance with still another feature of the invention, measured values are capable of projection onto a printed sheet serving as a projection area at the point at which they are actually measured. In addition to the settings of the inking zone openings, normally displayed by graphic bar graphs, spectral measured values can also be displayed, these spectral measured values being inserted in numbers at precisely the point on the printed sheet at which they were also measured. Thus, an unambiguous local association between measured values and measuring points on the printed sheet is possible.

In accordance with still a further feature of the invention, the device is portable. As a result, the display and/or operating device according to the invention can be used not only for controlling machines but also for maintenance purposes. If maintenance actions are to be taken at specific points of a machine, then maintenance personnel can have the device according to the invention throw an image onto the point of the machine at which the maintenance is being carried out. By the camera and a model of the machine to be maintained, stored in the control computer, it is possible to insert tips on the maintenance in context and, in particular, as a function of the projection area. If the operating personnel, for example, touch a specific signal cable, then, as a function in context and by the projection device, a text can be inserted that describes the task, the function, or the voltage level of the associated cable. As such, the maintenance personnel do not have to orient themselves by using a circuit diagram but can comfortably retrieve the appropriate information by the device according to the invention.

In this regard, it is also advantageous for any functionalities of the projection surface to be capable of acquisition by the acquisition device and for the control computer to incorporate these functionalities in the output of the projected image. In addition to the cables already mentioned, it is also possible for operating elements installed permanently on site to be taken into account so that the maintenance personnel, when touching these permanently installed operating elements, can be given additional help through texts inserted by the projection device, which makes the work easier for them. Because it is not possible for every operating element on a machine to be coupled to an operating monitor, by the portable devices and taking into account any functionalities of the projection surface, it is, nevertheless, also possible there to provide the maintenance personnel or the operator with additional information. Operating elements that are actually present can in this way be supplemented by an inserted virtual operating interface.

Furthermore, it is advantageous if the size of a printed sheet lying on the desk can be registered by the control computer and if the size of the projected image can be adapted automatically thereto. One or more optical or touch-sensitive sensors in the surface of the supporting desk can acquire the size and position of the printed sheet, for example. The size of the sheet determined is, then, transmitted to the control computer so that the projector accordingly supplies a projection image coinciding with the size of the sheet. This avoids part of the desk of which there is no sheet at all being illuminated. As such, unnecessary reflections are avoided.

In accordance with still an added feature of the invention, a color-testing lamp for illuminating a printed sheet lying on the desk is present and is connected to the control computer. The printer needs color-testing lamps for the visual assessment of the printed sheet. The color-testing lamp emits standardized light for this purpose so that the printer can check the correct color reproduction of the printed sheet. However, the lamp has to be switched off during the projection because, otherwise, the projected image cannot be detected on the printed sheet. It is, therefore, necessary for the control computer to coordinate the use of color-testing lamp and projection image. Switching the color-testing lamp off, dimming the light, or interrupting or deflecting the beam path of the color-testing lamp can carry out this coordination.

Provision can also be made for the projector and color-testing lamp to be combined in a projection lamp. In such a case, it is particularly advantageous if the latter only includes a projector that can both project an image and also emit monochromatic light for assessing the coloring of the printed sheet. The projector, as a projection lamp, then, also performs concomitantly the function of the color-testing lamp. Such a function can be implemented with a high output video projector. The advantage of such a combination is that it can also be controlled as a function of format, as compared with current solutions. It is, therefore, possible for a color-testing lamp/display to be used for all machine formats, and the illumination area additionally can be matched to the respective printing format of the current print job. The color of the light can be selected as desired. The amount of light projected onto the sheet can be controlled. A further advantage of such a combination is that the inner part of the projected image, that is to say, the part of the image that is projected onto the printing material, is used to illuminate the sheet with standard white light and appropriate display and operating elements can be projected around the sheet (at the sides or top and bottom).

In accordance with a concomitant feature of the invention, the connection of the control computer to the projection device and to the acquisition device is wired and/or wireless.

Other features that are considered as characteristic for the invention are set forth in the appended claims.

Although the invention is illustrated and described herein as embodied in a projection-area dependent display/operating device, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
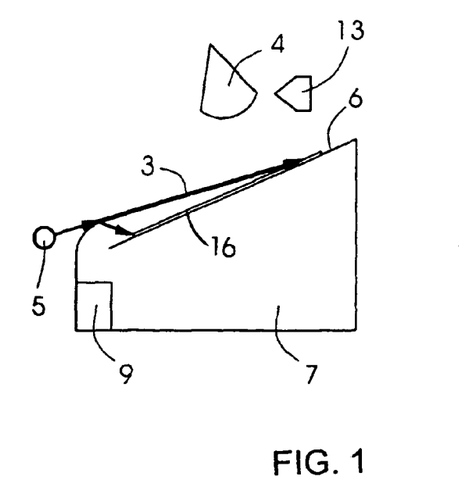
FIG. 1 is a side elevational view of a diagrammatic sheet-supporting desk according to the invention of a press having a projection device on the front side of the sheet-supporting desk and a camera above the supporting desk.
Figure 5:
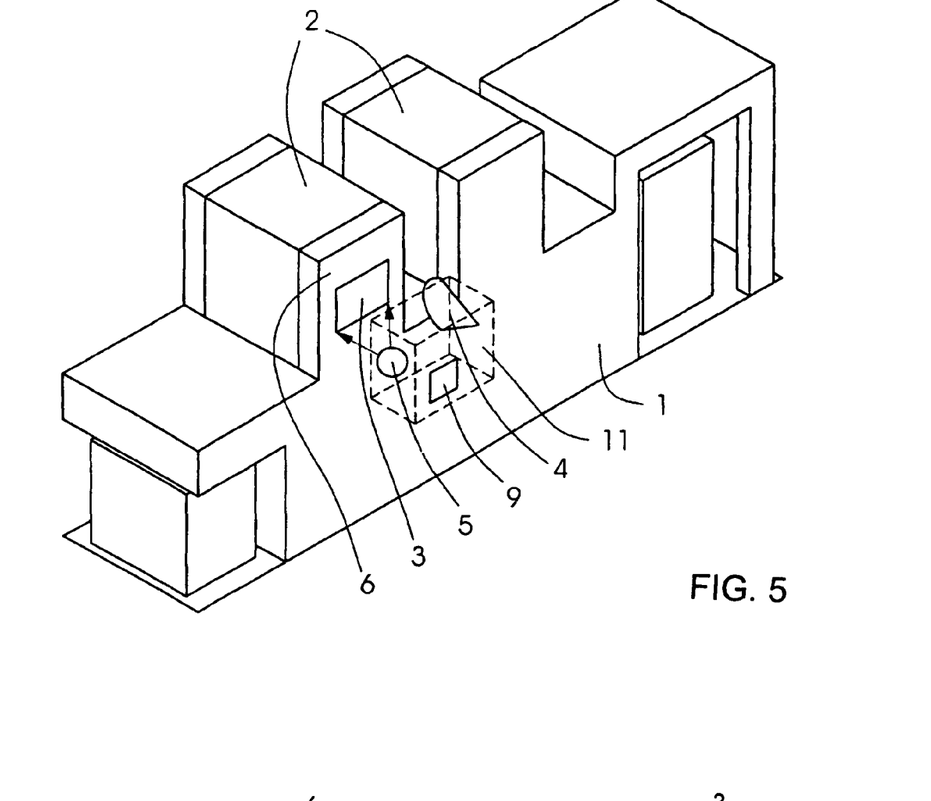
FIG. 5 is a perspective view a press with a partially hidden view of a portable device according to the invention.

Referring now to the figures of the drawings in detail and first, particularly to FIG. 1 thereof, there is shown a sheet-supporting desk 7, which is provided with a display and operating device according to the invention, beside the control station of a press 1 (see FIG. 5). For such a purpose, the sheet-supporting desk 7 has a control computer 9 that can communicate with a video and data projector 5 and a video camera 4. The communication can, in this case, function with wires or by wireless transmission. The projector 5 is located on the front side of the sheet-supporting desk 7, at which location there is normally a printer or other operating personnel. With the projector 5, any desired image 3 can be projected onto a projection area 6 of the sheet-supporting desk 7. The projection area 6 can, in this case, be the supporting surface of the desk 7 but can also be the surface of a white or printed sheet 16. This projection area 6 is scanned by a video camera 4 fitted above the sheet-supporting desk 7 to be able to adapt the image 3 projected onto the projection area 6 to various external conditions.

Figure 1A:
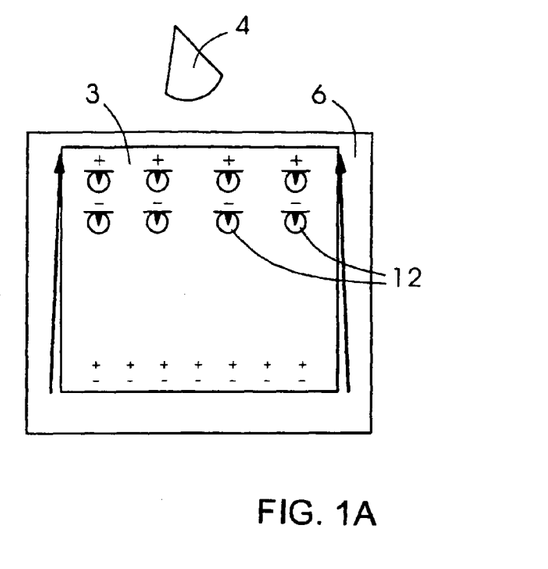
FIG. 1A is a plan view of the sheet-supporting desk of FIG. 1 with virtual operating elements inserted thereon.

In FIG. 1A it is possible to see a plan view from above of the sheet-supporting desk 7 so that it is possible to see on the projection area 6 the projection image 3 that, in this case, includes a plurality of operating elements 12 distributed over the projection area 6. The projector 5 throws these operating elements 12 onto the projection area 6 so that the operating personnel can trigger setting operations on the press 1 by touching the operating elements 12 on the projection area 6. If the operating personnel touch a "plus" key projected onto the projection area 6 shown in FIG. 1A, then the touch is detected by the video camera 4 and transmitted to the control computer 9. The control computer 9, in turn, then outputs appropriate actuating signals to the press 1 to effect corresponding setting operations there. If there is a printed sheet 16 lying on the sheet-supporting desk 7, then the projection image 3 is changed such that the virtual operating elements 12 shown in FIG. 1A can also still be seen on the printed sheet 16, which now serves as a projection area 6. For this purpose, for instance, the colored representation of the operating elements 12 is adapted appropriately or, if there is a very dark background, the configuration of the operating elements 12 is changed such that the operating elements 12 are, again, located in the visible region. This is necessary, for example, in the case of large black areas. Instead of the operating elements 12 shown in FIG. 1A or in combination with these, measured values that a measuring instrument 13 fitted above the sheet-supporting desk 7 has determined can also be inserted. Such a measuring instrument 13 can, for example, be used for the spectral measurement of a printed sheet 16. The measured values determined then can be displayed on the projection area 6 directly at the location at which they were actually measured on the printed sheet 16. Thus, an immediate and unambiguous association between measured values and measuring locations on the printed sheet 16 is possible.

In addition, fitted above the desk 7 is a color-testing lamp 14 (see FIG. 2), which ensures a standardized color temperature of normally 5000° Kelvin for the visual assessment of a printed sheet 16 on the desk 7. The color-testing lamp 14, the projector 5, and the camera 4 are connected to the control computer 9 to, in particular, be able to coordinate the projection of the image 3 with the light from the color-testing lamp 14. This is because the color-testing lamp 14 must be switched off to project the image 3 because, otherwise, the printer cannot see the image 3.

Figure 2:
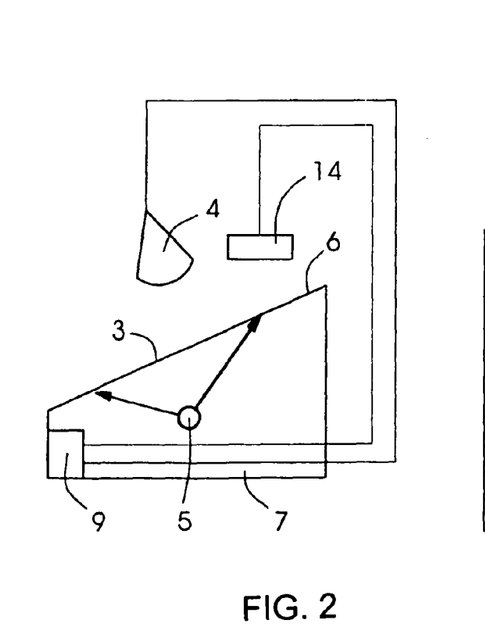
FIG. 2 is a side elevational view of a diagrammatic sheet-supporting desk according to the invention with a color-testing lamp in which the projector is disposed in the interior of the desk underneath a transparent projection area.
Figure 2A:
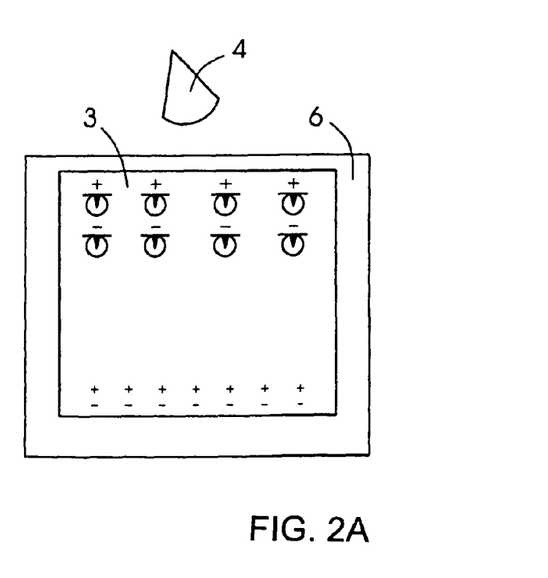
FIG. 2A is a plan view of the desk of FIG. 2.

FIG. 2 shows an alternative configuration of the sheet-supporting desk 7 from FIG. 1, in which the projector 5 for producing the projection image 3 is fitted in the interior of the sheet-supporting desk 7 and illuminates the projection area 6 from below. If a translucent printed sheet 16 that is not too thick is used, the projection image 3 can, nevertheless, be detected by the operating personnel, given an appropriately powerful projector 5, and, then, is displayed in a type of back-projection or rear-projection. In such a case, the sheet-supporting surface of the sheet-supporting desk 7 is made expediently of a translucent transparent material to permit the back-projection. Because, in the embodiment according to FIG. 2, the projector 5 is located in the interior of the sheet-supporting desk 7, it is protected optimally against external influences, which give it a longer lifetime. The video camera 4 in the embodiment according to FIG. 2 continues to be located above the sheet-supporting desk 7 to be able to scan the projection area 6. As can be seen in FIG. 2A, the appearance of the projection image 3 does not change fundamentally for the operating personnel as compared with FIG. 1A. Only the color representation will, of course, appear weaker because of the back-projection.

Figure 3:
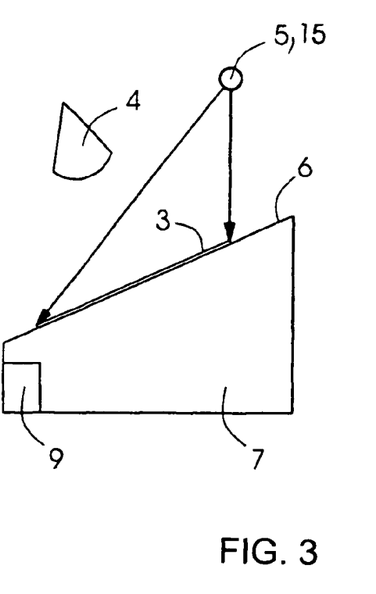
FIG. 3 is a side elevational view of a diagrammatic sheet-supporting desk according to the invention in which both a combined projection lamp and the camera are disposed above the desk.
Figure 3A:
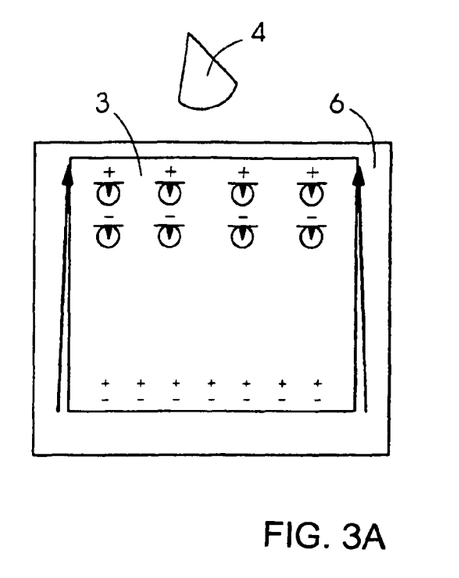
FIG. 3A is a plan view of the desk of FIG. 3.

A further possible way of fitting the projector 5 is revealed by FIG. 3, where the projector is fitted above the sheet-supporting desk 7 in the rear of the region facing away from the operating personnel. This reduces the formation of shadows on the projection area 6 when the operating personnel move over the sheet-supporting desk 7. In addition, the projector 5 is a special projection lamp 15, which contains a projector 5 and, at the same time, a color-testing lamp 14. The projection lamp 15 can also include only a special high-intensity video projector, which can be used both for projection and also for illuminating a printed sheet 16 on the desk 7, by the video projector emitting single-color test light and, as such, constituting the standard illumination for a printed sheet 16. Here, the illumination of the printed sheet 16 can be carried out automatically as a function of format, that is to say, the rectangular cone of light from the projection lamp 15 is automatically adapted to the size of the printed sheet 16 by a sensor. As can be seen in FIG. 3A, the representation of the projection image on the sheet-supporting desk 7 does not change fundamentally in this embodiment either.

Figure 4:
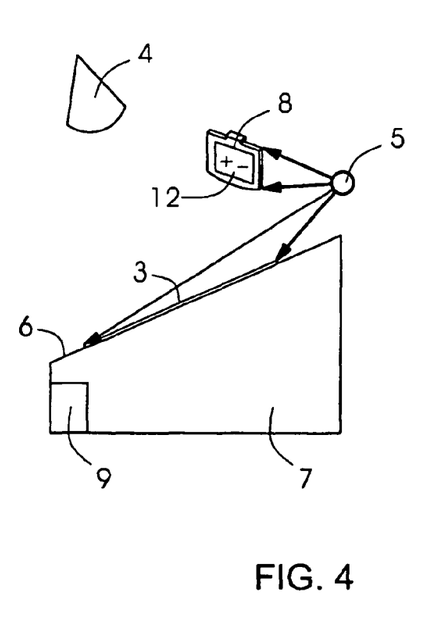
FIG. 4 is a side elevational view of a diagrammatic sheet-supporting desk according to the invention in which the projection device is fitted to the rear of the desk and a touch screen is provided.
Figure 4A:
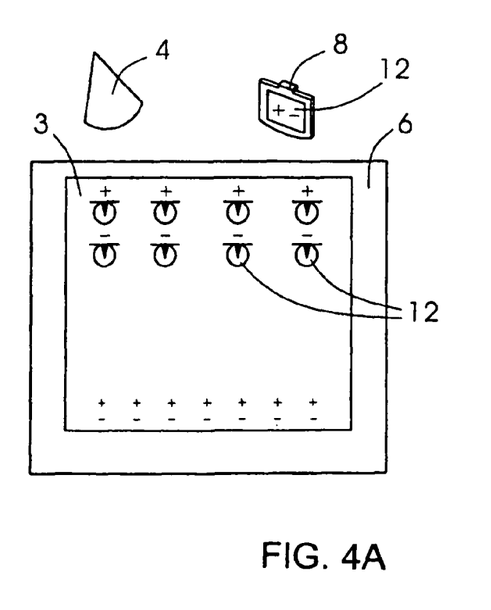
FIG. 4A is a plan view of the desk of FIG. 4.

In the embodiment according to FIG. 4, the projector 5, as compared with the embodiment in FIG. 3, is closer to the sheet-supporting desk 7, which reduces the possible formation of shadows by the operating personnel still further. In addition, there is also an operating desk 8 through which settings can, likewise, be made to the press 1. The operating desk 8 can be, for example, a conventional touch screen currently used in presses 1. The virtual operating elements 12 projected onto the projection area 6 in FIG. 4A can be seen in the same way on the additional operating desk 8. This provides the user with the possibility of making the changes either directly on the projection area 6 or on the operating desk 8. The operating desk 8 is also linked to the control computer 9, which receives and coordinates the inputs coming from the operating desk 8 and the inputs of the operating personnel detected by the video camera 4. At the same time, changes that are made on the projection area 6, and, likewise, those on the operating desk 8, become effective and vice-versa. The operating personnel, therefore, always have the same operating interface in front of them, regardless of whether operation through the operating desk 8 or projected operating interface 3 is preferred.

FIG. 5 reveals a portable embodiment of the invention, which substantially includes a portable projector 5 and a portable camera 4. The camera 4 and a projector 5 are, preferably, accommodated in a single housing to make it easier to coordinate the acquisition camera 4 and the projector 5. This housing constitutes the actual portable equipment 11. In FIG. 5 the portable equipment 11 can be used to make maintenance of a press 1 easier. The press 1 shown in FIG. 5 has two printing units 2 that are provided with side wall cladding. The maintenance personnel can, then, set up the portable equipment 11 including camera 4 and projector 5 in front of the side wall of the printing unit 2 so that a projection image 3 is thrown onto the side wall of a printing unit 2, used as a projection area 6. In such a case, the portable unit 11 is connected to a computer 9, either with or without wires, or the computer 9 is additionally integrated into the portable unit 11. Stored on the computer 9 is a model of the press 1, which can be compared with the data acquired by the camera 4. If the camera 4 acquires specific real operating elements on the side wall of the printing unit 2, these are compared with the data stored on the computer 9 of the portable unit 11, and help can be provided for the operating personnel by integrating appropriate help text into the projection image 3. In such a case, however, the camera 4 is not just able to acquire real operating elements but, also, all other interchangeable or movable components of the press 1, provided they are stored in the model on the computer 9 of the portable unit 11. As a result, the maintenance personnel can also be helped during the removal of rolls, by the video camera 4 automatically detecting the roll to be removed and communicating to the maintenance personnel, through the projection image 3, which roll is concerned and, in addition, what help there is for installation and removal. This comprehensive help distinguishes the portable unit 11 substantially from a conventional wireless remote control system, with which it would, likewise, be possible for the operating personnel to perform settings on the press 1 from any desired point on the same. However, a wireless remote control system cannot take into account any setting changes carried out on the press 1 by the maintenance personnel. In addition, a wireless remote control system cannot provide any locally assignable help either because it lacks the acquisition devices 4.

Figure 6:
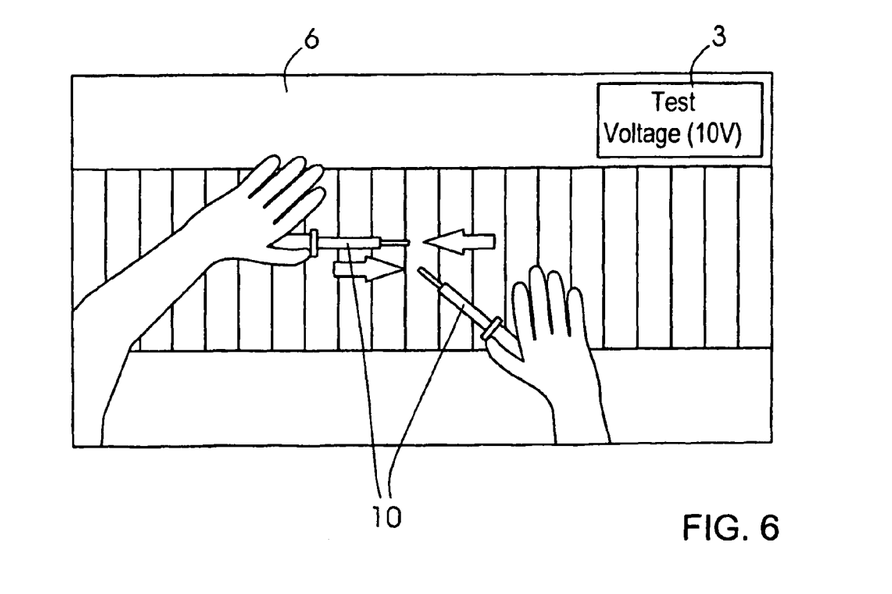
FIG. 6 is a diagrammatic illustration of help text inserted as a function of a projection surface to assist the maintenance personnel with the desk according to the invention.

This is further made clear in FIG. 6, which concerns the checking of voltages on specific electrical components on a press 1. Because the electrical components are normally very similar and are often also closely packed in a small space, the operating personnel appreciate it very much if the correct association between the electrical components is made easier for them. In this case, too, the portable unit 11 from FIG. 5 is helpful in that it, for example, can observe the current location of a testing tool 10 for voltage testing by the camera 4 and as such, by the projection image 3, can provide the maintenance personnel with appropriate information relating to the component currently touched. Thus, looking at the circuit diagram in the operating instructions is dispensed with as far as the maintenance personnel are concerned. If the maintenance personnel touch a component by the testing tool 10, it is additionally possible to inform the maintenance personnel through the projection image 3 what maintenance work still has to be carried out on this component in addition to the voltage testing.

Figure 7:
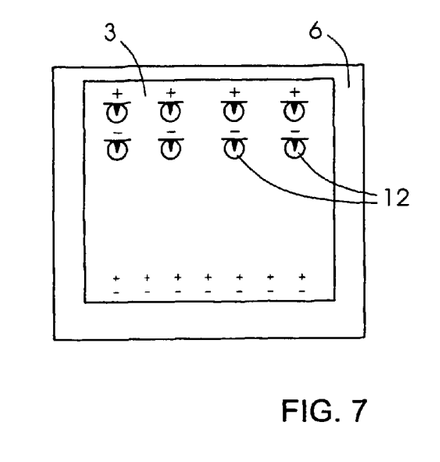
FIG. 7 is a side elevational view of a diagrammatic sheet-supporting desk according to the invention in which the projection device and the camera are fitted above the desk and a projection is also made onto a wall behind the desk.
Figure 7A:
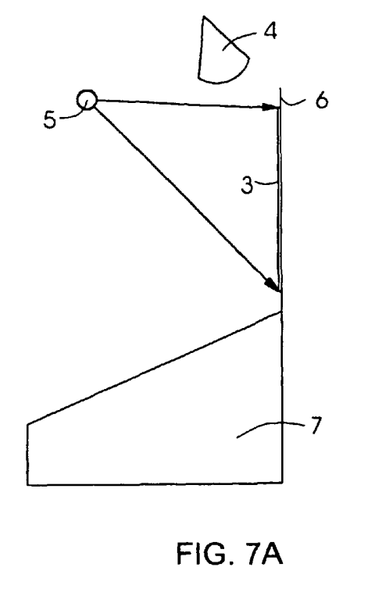
FIG. 7A is a plan view of the projected images of FIG. 7.

An expanded embodiment is shown by FIG. 7. Here, the projector 5 and the camera 4 are located above the sheet-supporting desk 7. The projector 5 simultaneously projects images 3 onto the surface 6 of the sheet-supporting desk 7 and onto the surface 6 of the rear wall behind the desk 7. Therefore, two operating interfaces 3 can be projected, it even being possible for the interfaces 3 to be different if the projector 5 is configured as a double unit having two objectives for the simultaneous projection of different images. Such a projector 5 could, for example, be assembled from two conventional video projectors. If the projector 5 has only one unit, the images 3 on the surfaces 6 are identical, the second image 3 being generated through an optical deflection unit, such as a mirror. Of course, it is also possible in the embodiment to dispense with the image 3 on the desk 7 and to provide only the projection of the image 3 onto the rear wall on the desk 7. FIG. 7A shows the image 3 from FIG. 7.

Figure 8:
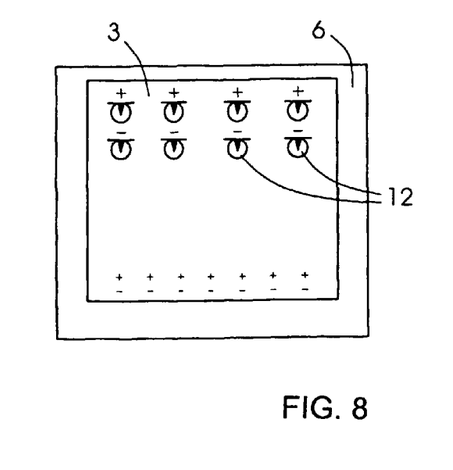
FIG. 8 is a side elevational view of a diagrammatic sheet-supporting desk according to the invention in which the projection device is fitted above the desk and the camera is behind a wall and a projection is made onto a wall behind the desk.
Figure 8A:
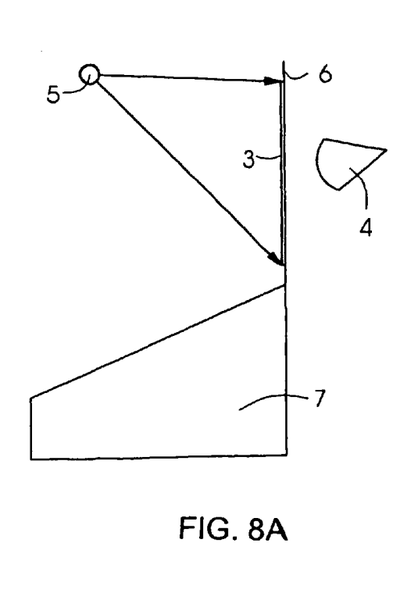
FIG. 8A is a plan view of the projected image of FIG. 8.

The embodiment in FIG. 8 differs from the embodiment in FIG. 7 in the fact that the camera 4 is located behind the rear wall of the desk 7 to which the projection is made. For such a purpose, the surface 6 and the rear wall must be translucent, a double projection also being possible in FIG. 8, as in FIG. 7. Here, too, FIG. 8A shows the image 3 from FIG. 8.

Figure 9:
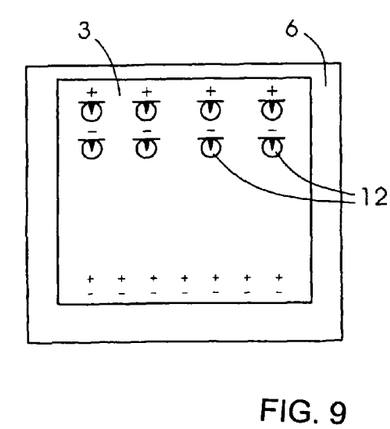
FIG. 9 is a side elevational view of a diagrammatic sheet-supporting desk according to the invention in which a back-projection device is fitted behind a wall and the camera is fitted above the desk and a projection is made onto a wall behind the desk.
Figure 9A:
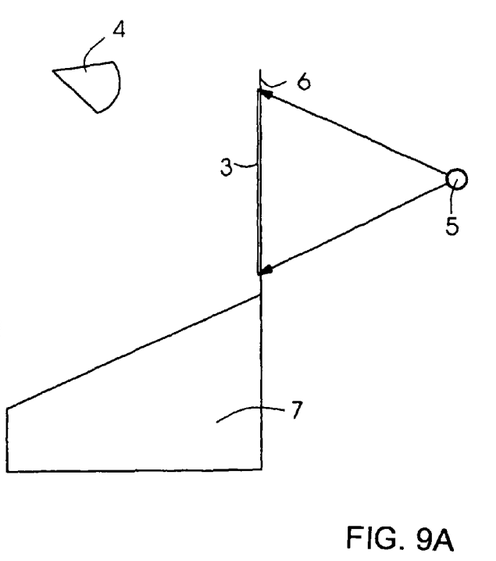
FIG. 9A is a plan view of the projected image of FIG. 9.

A further embodiment according to FIG. 9 differs from the embodiment in FIG. 8 in the fact that the camera 4 and the projector 5 have changed places. Here, the projector 5 is behind the translucent rear wall of the desk 7, and the camera 4 is positioned in front of the rear wall above the desk 7. Here, too, FIG. 9A shows the image 3 from FIG. 9.

Figure 10:
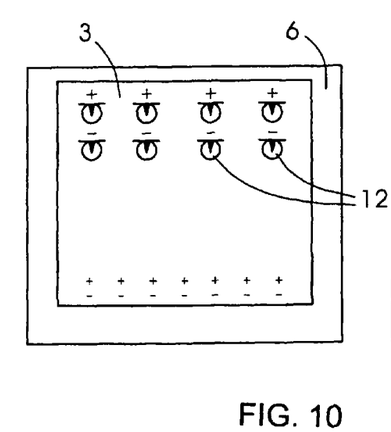
FIG. 10 is a side elevational view of a diagrammatic sheet-supporting desk according to the invention in which a back-projection device and the camera are fitted behind a wall above the desk and a projection is made onto the wall behind the desk.
Figure 10A:
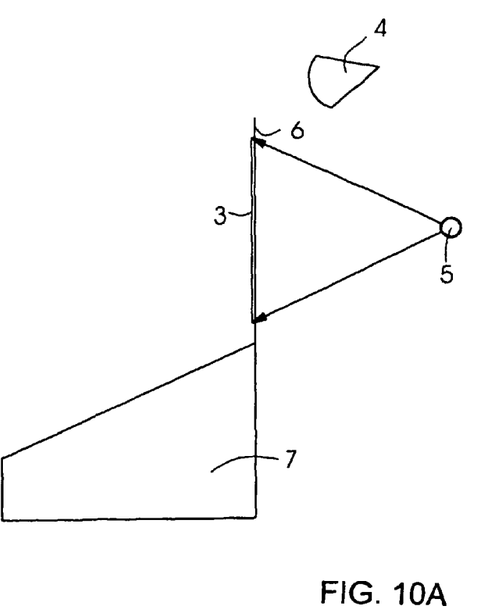
FIG. 10A is a plan view of the projected image of FIG. 10.

The embodiment according to FIG. 10 differs from the embodiment in FIG. 9 in the fact that both the camera 4 and the projector 5 are located behind the translucent rear wall of the desk 7. Here, too, FIG. 10A shows the image 3 from FIG. 10. The numerous possibilities listed for positioning camera 4, measuring instruments 13 and projector 5 can of course also be configured with the various embodiments of the projector 5 itself, namely as a combined projection lamp 15 or in combination with the color-testing lamp 14.

This application claims the priority, under 35 U.S.C. §119, of German patent application No. 10 2004 004 395.7, filed Jan. 29, 2004; the entire disclosure of the prior application is herewith incorporated by reference in its entirety.

We claim:

1. A display and/or operating device for controlling machines, comprising:
   a projection device for projecting an image onto a projection area, said image being an operating interface having an appearance;
   said operating interface for being projected onto a printing material of a press;
   said operating interface for being projected onto a printed printing material;
   an acquisition device for scanning said projection area;
   a control computer connected to said projection device and to said acquisition device by a connection for controlling said projection device and said acquisition device, said connection of said control computer to said projection device and to said acquisition device is at least one of wired and wireless; and
   said control computer being programmed:
      to carry out an analysis of said projection area with said acquisition device; and
      to control content of said image to be projected as a function of a result of said analysis of said projection area; and
      to change said appearance of said operating interface as a function of a color of the printing material.

2. The device according to claim 1, wherein: said operating interface has operating elements; and
   an appearance of said operating interface depends upon at least one of said operating elements one of touched and actuated on said operating interface.

3. The device according to claim 1, wherein changes made on said operating interface are displayed on said projection area by said projection device.

4. The device according to claim 1, wherein said operating interface is to be operatively connected to a press for controlling the press.

5. The device according to claim 1, further comprising a press, said operating interface being operatively connected to said press for controlling said press.

6. The device according to claim 5, wherein: said press has operating elements for setting a register; and
   at least one of said projection device, said acquisition device, and said control computer is configured to actuate said operating elements by touching a register mark on a printed sheet disposed in said projection area.

7. The device according to claim 5, wherein said press has an inking zone setting activated when a color measuring strip of a printed sheet disposed at said projection area is touched.

8. The device according to claim 1, wherein:
   a printed sheet serves as said projection area; and
   measured values are projected onto said printed sheet at a point at which said values are actually measured.

9. The device according to claim 1, wherein said projection device, said acquisition device, and said control computer, together, are portable.

10. The device according to claim 1, wherein:
    said projection area has functionalities; and
    said acquisition device acquires said functionalities; and
    said control computer incorporates said functionalities in an output of said image of said projection device.

11. The device according to claim 1, wherein if the changes made on said operating interface are not acceptable to an operator, the operator can change them again without difficulty, without first having to make a proof print.

12. The device according to claim 1, wherein said projection area has sides and said projection device and said acquisition device are on the same one of said sides with respect to said projection area.

13. A display and/or operating device for controlling machines, comprising:
    a projection device for projecting an image onto a projection area, said image being an operating interface having an appearance;
    said operating interface for being projected onto a printing material of a press;
    said operating interface for being projected onto a printed printing material;
    an acquisition device for scanning said projection area;
    a sheet support;
    a sheet-supporting desk having an interior, and
    said projection device being disposed underneath said sheet support in said interior of said sheet-supporting desk;
    a control computer connected to said projection device and to said acquisition device for controlling said projection device and said acquisition device; and
    said control computer being programmed:
       to carry out an analysis of said projection area with said acquisition device; and
       to control content of said image to be projected as a function of a result of said analysis of said projection area; and
       to change said appearance of said operating interface as a function of a color of the printing material.

14. The device according to claim 13, wherein a size of a printed sheet lying on said desk is registered by said control computer through said acquisition device and a size of said image projected is adapted automatically to said registered size of the printed sheet.

15. The device according to claim 13, further comprising a color-testing lamp for illuminating a printed sheet lying on said sheet-supporting desk, said color-testing lamp being connected to said control computer.

16. The device according to claim 15, wherein said projection device and said color-testing lamp are combined in one projection lamp.

17. A display and/or operating device for controlling machines, comprising:
    a projection device for projecting an image onto a projection area, said image being an operating interface having an appearance;
    said operating interface for being projected onto a printing material of a press;
    said operating interface for being projected onto a printed printing material;
    an acquisition device for scanning said projection area;
    said projection device being disposed on one side of said projection area and said acquisition device being disposed on another side of said projection area;
    a control computer connected to said projection device and to said acquisition device for controlling said projection device and said acquisition device; and
    said control computer being programmed:
       to carry out an analysis of said projection area with said acquisition device; and
       to control content of said image to be projected as a function of a result of said analysis of said projection area; and to change said appearance of said operating interface as a function of a color of the printing material.

18. A press, comprising:

at least one printing unit; and a display and/or operating device for controlling said at least one printing unit having:

a projection device for projecting an image onto a projection area, said image being an operating interface having an appearance;

said operating interface for being projected onto a printing material of a press;

said operating interface for being projected onto a printed printing material;

an acquisition device for scanning said projection area;

a control computer connected to said projection device and to said acquisition device by a connection for controlling said projection device and said acquisition device, said connection of said control computer to said projection device and to said acquisition device is at least one of wired and wireless; and said control computer being programmed:

to carry out an analysis of said projection area with said acquisition device;

to control content of said image to be projected as a function of a result of said analysis of said projection area; and to change said appearance of said operating interface as a function of a color of the printing material.

* * * * *